United States Patent Office 3,809,781
Patented May 7, 1974

3,809,781
SOLUBLE COFFEE OF IMPROVED STABILITY AND FLAVOR
Robert F. Howland, New City, N.Y., Michael H. Mansky, Upper Montclair, N.J., and Willie J. Richards, Garnerville, N.Y., assignors to General Foods Corporation, White Plains, N.Y.
No Drawing. Filed Apr. 28, 1972, Ser. No. 248,506
Int. Cl. A23f 1/08
U.S. Cl. 426—384
7 Claims

ABSTRACT OF THE DISCLOSURE

Soluble coffee of improved stability during storage is prepared by removing a portion of the aromatics from an aqueous coffee extract, drying the remaining extract, fixing the removed aromatics by mixing them in solution with a fixative and freeze-drying the resultant solution, and adding at least a portion of the fixed aromatics to the dried remaining extract. The soluble coffee powder so prepared is characterized by its lack of off-flavors normally developed during storage.

BACKGROUND OF THE INVENTION

This invention relates to soluble coffee and more particularly to the preparation of a soluble coffee of improved stability during storage.

The use of conventional spray drying techniques to prepare soluble coffee from an aqueous extract has long been known to result in a loss of desirable volatile constituents responsible for the characteristic aroma and flavor of fresh coffee. The addition of aroma concentrates such as coffee oil or distilled aroma fractions to the coffee powder after spray drying has been used in an effort to replace these lost aromatics but use of such methods has generally not resulted in obtaining a final product equal in quality to the undried extracts. Also, difficulties have been encountered in the preparation of good quality aroma concentrate.

Processing variations such as low-temperature spray drying and freeze drying have generally proven successful in varying degrees in preventing the volatilization of the desirable aromatics. However, it has been found that increased retention of these aromatics is more likely to lead to the development of off-flavors in the coffee after several months of storage. The development of these off-flavors is believed to be caused by the reaction of two or more of the aromatic constituents in the coffee rather than by the presence or decomposition of a single component. Selective removal of one or all of the reactive constituents, then, while inhibiting the reaction to off-flavors during storage, results in the loss of the removed constituent's desirable aroma and flavor contribution and also the removal of other flavor notes. Chemical conversion of the off-flavor precursors to non-reactive products, such as described in U.S. 3,482,988, similarly results in the loss of the independent, desirable aroma and flavor contribution imparted to the coffee by the reactive constituents.

It is accordingly an object of this invention to prepare a soluble coffee containing nearly all the original aromatic constituents present in the coffee extract but which does not develop off-flavors during storage.

SUMMARY OF THE INVENTION

It has been found in accordance with this invention that a soluble coffee of improved stability may be prepared by removing a portion of the aromatics from a coffee extract, drying the remaining extract, fixing the removed aromatics by mixing them in solution with a fixative and freeze-drying the resultant solution, and re-incorporating at least a portion of the fixed aromatics into the dried remaining extract. The resulting coffee product contains nearly all the original aromatics present in the extract and upon reconstitution with hot water after prolonged storage of the product the fixed aromatics are released into the coffee brew resulting in a fully aromatized coffee with no off-flavors. The process of this invention is applicable to both freeze-dried and spray-dried coffees and also to decaffeinated and undecaffeinated extracts. Particular fixatives which have been found useful for the purpose of this invention are water soluble carbohydrates.

DETAILED DESCRIPTION OF THE INVENTION

The soluble coffee product of this invention is characterized by its high retention of the aromatics originally present in the aqueous extract before drying and by the absence of the off-flavors normally developed during storage in soluble coffees containing a full complement of aromatics.

In the practice of this invention, aqueous coffee extract obtained by conventional extraction methods is subjected to evaporation to remove a portion of the aromatics present in the extract. The removal is intended to separate reactive components present in the extract by taking advantage of their relative volatilities. Thus by separating a reactive component from its complementary reactant, the reaction of these components to off-flavors during storage is inhibited. While the specific compounds so separated are not known, it has been found that subjecting the aqueous extract to evaporation to remove from about 2% to about 20% by weight of the extract apparently effects the desired separation of the component responsible for the reaction to off-flavors during storage.

Since the extract, which is mostly water, will evaporate at any number of equivalent pressure and temperature conditions, the evaporation may be carried out over a wide range of conditions sufficient to vaporize the extract and thus carry off the desired volatiles. As hereinafter employed, the term "volatiles" is intended to relate to those constituents removed from the extract, while the term "nonvolatile" is applied to the constituents allowed to remain in the extract.

While a wide variety of evaporation conditions may be employed, it is preferable that temperatures in excess of about 200° F. should be avoided since a burnt character appears to be imparted to the remaining extract at such temperatures. Use of extremely low temperatures, of course, is subject to the practical limitations of supplying sufficient vacuum to vaporize at such conditions.

The percentage of extract removed, as previously stated, should be at least 2% by weight of the starting extract to insure removal of the desired aromatic constituent fraction. Removal of greater than about 20% by weight of the extract generally may effect the removal of nondesired aromatics. Preferably, the weight percent of extract removed should be from about 5% to about 12% of the starting extract, with about 10% the most preferred.

The extract remaining after evaporation is then dried using conventional techniques. It has been found that the use of low-temperature drying conditions such as freeze-drying or low-temperature spray-drying are the preferable means of drying since these methods insure a high retention of the non-volatile flavor and aroma constituents, i.e., those not previously stripped from the extract. While the lowest possible drying temperatures are preferred, however, it is found that the process of this invention may also be used to improve the flavor and aroma of soluble coffees prepared at higher drying temperatures.

As previously mentioned, removal of the volatile reactants, while effective in inhibiting the reaction to off-flavors during storage, results in the loss of their independent valuable flavor and aroma contribution along with other desirable flavor notes. In order to retain the desirable characteristics imparted by these volatiles it is necessary to recapture them and add them back to the freeze-dried stripped extract. Conventional condensation methods and collection on liquid nitrogen traps are suitable means for recovering the aromatics removed from the extract.

The resultant condensate solution containing the aromatics removed from the coffee extract is then mixed with an aqueous solution of a fixative and freeze-dried. The fixative serves to render the removed volatiles inert to reaction with their complementary reactants present in the extract. At least a portion of the fixed particles are then reincorporated into the powder prepared from the stripped extract. During storage, the reactive components, now physically separated but in the same container, are thus unable to react and develop the off-flavors normally associated with soluble coffees of high volatile retention after prolonged storage periods. Upon reconstitution in hot water, the fixed aromatics are released into the brew resulting in a coffee whose flavor and aroma constituents closely resemble those contained in the original extract.

While fixing the removed aromatics, the addition of a fixative to the condensate solution further serves to facilitate recovery of these components, supplying a sufficient solids content to the aromatic/fixative solution such that subsequent freeze-drying results in an almost complete recovery and retention of these aromatics.

In light of the above considerations, then, the fixative must possess certain physical and chemical qualities. It must be water soluble and must not contain the complementary non-volatile components present in the stripped extract which react with the volatiles to form off-flavors. Further, since alteration of the volatiles even to non-reactive stable components is undesirable, the fixative must be one that is inert to these volatile constituents which are to be protected. Also, since the fixative remains in the coffee product, it must necessarily be edible, compatible with coffee formulations, and should not impart any undesirable off-tastes.

Suitable fixatives that may be employed are bland, water soluble carbohydrates, such as dextrins, corn syrup, corn syrup solids, dextrose, lactose, and the like, or other like water soluble materials, such as gums. These materials are inert to those aromatics which are to be fixed and have been found to impart no off-tastes to the final coffee product. Upon reconstitution with hot water after storage, the fixative dissolves, thereby releasing the aromatics into the brew and providing coffee containing a full complement of flavor and aroma components without any off-flavors.

The amount of fixative added to the condensate solution is necessarily dependent upon the type fixative used, the amount necessary to effectively recover the removed aromatics, and the amount necessary to render the aromatics inert to reaction. We have found, as a general consideration, that addition of the fixative in an amount sufficient to supply at least about 10% total solids to the aromatic/fixative solution is the preferred amount.

The following examples are presented to illustrate specific embodiments of this invention.

EXAMPLE I

Two thousand cc's of aqueous coffee extract containing 25.6% solids by weight was placed in an evaporator reservoir and circulated through a heat exchanger coil immersed in a hot water bath at a rate of 8 gallons/hour. The hot water was maintained at a temperature of about 160–165° F. After equilibration was achieved, the temperature of the evaporating extract within the reservoir was 118±3° F. and the vacuum in the reservoir was 26.5 inches of mercury. After 40 minutes, a quantity of condensate equal in weight to 10% of the starting extract had been striped and collected using a condensing coil immersed in an ice water bath. The solids concentration of the condensate was 2.2% by weight due to the mechanical entrainment of coffee solids in the evaporating vapors. The condensate was used to make a 10% solution of Maltrin, a bland carbohydrate from hydrolyzed cereal solids. This solution was then freeze-dried.

Three samples were then prepared:

1. A freeze-dried product prepared from untreated extract from the same batch of the feed material used in the run;
2. A freeze-dried product prepared from the remaining extract removed from the evaporator reservoir after the run;
3. The freeze-dried product of (2) with all of the freeze-dried aromatic/fixative mixture added back.

Total freeze-drying time was 24 hours and the product temperature was not allowed to exceed 110° F. The samples were packed in jars, sealed, and stored in a controlled environment at 110° F.

After two weeks in storage, coffee brews at 1.35% solids concentration were made up from each of the above samples. Sample 1 exhibited strong off-notes while Sample 2 exhibited no off-notes but was also found to be flat and lacking in aromatic notes.

However, Sample 3, prepared by combining the freeze-dried powder of the stripped extract and the freeze-dried powder of the Maltrin/condensate solution exhibited no off-notes yet still retained a full complement of aromatic flavor notes.

While this invention has been described with respect to the specific embodiments presented above, they are intended to be illustrative of only a few of the possible applications of this invention. Variations in the methods of removal, the fixative employed, and the like, are therefore, believed to be ascertainable without departing from the scope and spirit of this invention.

We claim:

1. A process of preparing soluble coffee powder of improved stability during storage, comprising:
    (a) removing a portion of the aromatics from an aqueous coffee extract by subjecting said extract to evaporation for a time sufficient to remove from about 2% to about 20% by weignt of said extract;
    (b) drying the remaining extract from (a);
    (c) condensing and collecting said removed aromatic portion;
    (d) mixing said collected aromatic portion in solution with a water-soluble carbohydrate fixative and freeze-drying the resultant solution; and
    (e) mixing the dried product of (b) with at least a portion of the dried product of (d).

2. The process of claim 1 wherein said remaining extract is freeze-dried.

3. The process of claim 2 wherein said removed aromatic portion is from about 5% to about 12% by weight of the extract.

4. The process of claim 3 wherein said removed portion is about 10% by weight of the extract.

5. The process of claim 4 wherein said evaporation is conducted at temperatures of from about 115° F. to about 121° F. and a vacuum of from about 26 to 27 inches of mercury.

6. The process of claim 5 wherein said fixative is added to said removed aromatic portion in an amount sufficient to result in a solution having a solids concentration of about 10% by weight.

7. The product of the process of claim 3.

References Cited

UNITED STATES PATENTS

| | | | |
|---|---|---|---|
| 2,906,630 | 9/1959 | Turkot et al. | 99—71 X |
| 2,166,074 | 7/1939 | Reichel | 99—71 UX |
| 2,927,860 | 3/1960 | Seltzer et al. | 99—77 |
| 2,641,550 | 6/1953 | Dykstra et al. | 99—71 UX |
| 3,244,533 | 4/1966 | Clinton et al. | 99—71 |

FOREIGN PATENTS

| | | |
|---|---|---|
| 575,118 | 2/1946 | Great Britain. |

OTHER REFERENCES

Sivetz, Coffee Processing Technology, vol. 2, 1963, pp. 50–55.

FRANK W. LUTTER, Primary Examiner

W. L. MENTLIK, Assistant Examiner

U.S. Cl. X.R.

426—387